(12) United States Patent
Kim

(10) Patent No.: US 7,047,373 B2
(45) Date of Patent: May 16, 2006

(54) MEMORY CONTROL APPARATUS AND METHOD FOR CONTROLLING MEMORY ACCESS CAPABLE OF SELECTING DESIRABLE PAGE MODE

(75) Inventor: Young-sik Kim, Seoul (KR)

(73) Assignee: Samsung Electronics, Co., Ltd., (KR)

( * ) Notice: Subject to any disclaimer, the term of this patent is extended or adjusted under 35 U.S.C. 154(b) by 343 days.

(21) Appl. No.: 10/639,343

(22) Filed: Aug. 12, 2003

(65) Prior Publication Data

US 2004/0044839 A1    Mar. 4, 2004

(30) Foreign Application Priority Data

Sep. 4, 2002    (KR) ...................... 10-2002-0053334

(51) Int. Cl.
*G06F 12/00*    (2006.01)
(52) U.S. Cl. ...................... 711/154; 711/105; 711/170; 345/570
(58) Field of Classification Search ................ 711/154, 711/105, 170; 345/533, 570
See application file for complete search history.

(56) References Cited

U.S. PATENT DOCUMENTS 5,159,676 A * 10/1992 Wicklund et al. ........... 711/107
6,052,134 A * 4/2000 Foster ......................... 345/533

FOREIGN PATENT DOCUMENTS

JP    5-334175    12/1993

OTHER PUBLICATIONS

Kim, et al., "An Effective Memory-Processor Integrated Architecture for Computer Vision", © 1997 IEEE, pp. 266-269.*
Kim, et al., "A System Manager for Network System-on-a-Chip Designs with Various Memory Access Types",© 2001 IEEE, pp. 176-179.*
Kim, et al., "A Memory Access System for Merged Memory with Logic LSIS",© 1999 IEEE, pp. 384-387.*

* cited by examiner

*Primary Examiner*—Brian R Peugh
(74) *Attorney, Agent, or Firm*—Mills & Onello LLP

(57) ABSTRACT

In a memory control apparatus and a method for controlling memory access capable of selecting a desirable page mode, so as to reduce memory access time, a storage circuit receives threshold page hit ratios for each of a plurality of bus masters, and stores the threshold page hit ratios. A page hit ratio computing circuit receives the number of memory accesses by each of the bus masters and the number of page hits by each of the bus masters, computes page hit ratios by each of the bus masters, and outputs the page hit ratios. A comparing circuit compares the threshold page hit ratios with the computed page hit ratios obtained from the page hit ratio computing circuit, and outputs predetermined page mode control signals. The page mode control signals control the page modes of the memory by each of the bus masters in response to the comparison result.

20 Claims, 5 Drawing Sheets

MEMORY CONTROL APPARATUS AND METHOD FOR CONTROLLING MEMORY ACCESS CAPABLE OF SELECTING DESIRABLE PAGE MODE

This application claims the priority of Korean Patent Application No. 2002-53334 filed on Sep. 4, 2002, in the Korean Intellectual Property Office, the disclosure of which is incorporated herein in its entirety by reference.

BACKGROUND OF THE INVENTION

1. Field of the Invention

The present invention relates to an apparatus and method for controlling memory, and more particularly, to a memory control apparatus and a method for controlling memory access by which a desirable page mode is selected to reduce memory access time.

2. Description of the Related Art

Information computing systems primarily utilize bus systems on which various functional blocks communicate data and control signals. In a system-on-chip (SOC) design in which various Internet protocol (IP) blocks are integrated on a single semiconductor chip, the IP blocks are generally connected with each other using bus systems. In a typical SOC system, the various IP blocks can be classified as bus masters, bus slaves, or system arbiters, etc.

A memory controller is an example of a bus slave and is important in the SOC system. The plurality of bus masters can independently access an external memory chip of the SOC system through the memory controller.

FIG. 1 is a schematic diagram of an interface between an external memory with a SOC system. Generally, a SOC system 100 includes a plurality of bus masters 111, 112 and 113, a bus 114, and a plurality of bus slaves (not shown). The memory controller 121 is used as an example of a bus slave.

The memory controller 121 arbitrates memory access to an external memory 130 by the plurality of bus masters 111, 112 and 113, which are connected to the bus 114 of the SOC system 100. That is, each of the bus masters 111, 112 and 113 can independently access the external memory 130 of the SOC system 100 through the memory controller 121.

The procedure for accessing the external memory 130 includes a precharge operation, a row access operation, a column access operation, and a refresh operation. The mode in which the memory 130 is paged is categorized into an open page mode and a closed page mode according to the starting time of the precharge operation of the memory 130. Thus, memory access times associated with the open and closed page modes are different from each other.

FIG. 2 illustrates the relationship between the respective page modes and the memory access time. If a page hit occurs in the open page mode, only the column access operation with respect to an active row among the four access operations of the memory 130 is performed. If a page miss occurs in the open page mode, all of the four operations are performed.

The precharge operation is performed in the closed page mode immediately after the memory access is completed. The row access operation and the column access operation are preformed irrespective of whether a page hit or a page miss occurs in the closed page mode. As can be seen in FIG. 2, in the case where the page hit occurs in the open page mode, the memory access time is reduced, and in the case where the page miss occurs in the closed page mode, the memory access time is reduced.

As shown in FIG. 2, $\alpha$ represents precharge time, $\beta$ represents row access time, and $\gamma$ represents column access time. Supposing that h represents page hit ratio, the average memory access time in the open page mode is expressed as Equation 1 when the refresh operation is not considered:

$$\text{MemoryAccessTime} = \gamma h + (\alpha + \beta + \gamma)(1-h) \quad (1)$$

On the other hand, the average memory access time in the closed page mode is expressed as Equation 2 when the refresh operation is not considered:

$$\text{MemoryAccessTime} = \beta + \gamma \quad (2)$$

In order to reduce the memory access time in the open page mode as compared to that of the closed page mode, Equation 3 is obtained from Equations 1 and 2:

$$h > \frac{\alpha}{\beta + \gamma} \quad (3)$$

Conventionally, only one of the open page mode and the closed page mode can be selected at a time. However, if the page hit ratio is larger than a predetermined value $$\left(\frac{\alpha}{\beta + \gamma}\right)$$

obtained from Equation 3, in the case where the open page mode has already been selected, the memory access time is increased. In contrast, if the page hit ratio is smaller than the predetermined value $$\left(\frac{\alpha}{\beta + \gamma}\right),$$

in a case where the closed page mode has already been selected, the memory access time is reduced.

SUMMARY OF THE INVENTION

The present invention provides a memory control apparatus capable of selecting a desired page mode according to page hit ratio. In this manner, memory access time is reduced.

The present invention also provides a method for controlling memory access capable of selecting a desired page mode according to page hit ratio.

According to a first aspect of the invention, there is provided a memory control apparatus for controlling memory access to a memory by at least one bus master. The apparatus includes a page hit ratio computing unit which receives a first parameter based on a number of memory accesses by the at least one bus master and a second parameter based on a number of page hits by the at least one bus master, computes at least one page hit ratio for the at least one bus master based on the first and second parameters, and outputs the at least one page hit ratio. A comparing unit compares at least one threshold page hit ratio with the at least one computed page hit ratio, and outputs at least one page mode control signal in response to the comparison result, wherein the at least one page mode control signal controls a page mode of the memory by the at least one bus master.

Preferably, the apparatus further includes a storage unit which receives and stores the at least one threshold page hit ratio corresponding to at least one bus master.

Preferably, the page hit ratio computing unit includes a first register which stores the number of memory accesses by the at least one bus master and a second register which stores the number of page hits by the at least one bus master. A computing unit receives the number of memory accesses from the first register and the number of page hits from the second register, and computes the at least one computed page hit ratio of the at least one bus master.

If the at least one computed page hit ratio for a corresponding at least one bus master is greater than the corresponding at least one threshold page hit ratio, the comparing unit outputs at least one page mode control signal to cause the memory to operate in an open page mode for the bus master. If the at least one computed page hit ratio for a corresponding at least one bus master is less than the corresponding at least one threshold page hit ratio, the comparing unit outputs at least one page mode control signal to cause the memory to operate in a closed page mode for the bus master.

According to a second aspect of the invention, there is provided a memory control apparatus for controlling a memory access to a memory by a plurality of bus masters. The apparatus includes a page hit ratio computing unit which receives, for each of the plurality of bus masters, a first parameter based on a number of memory accesses by the corresponding bus master and a second parameter based on a number of page hits by the corresponding bus master, which computes a page hit ratio for the plurality of bus masters, and which outputs the computed page hit ratio. A comparing unit compares a threshold page hit ratio for the memory with the computed page hit ratio, and outputs a page mode control signal in response to the comparison result, wherein the page mode control signal controls a page mode of the memory by the plurality of bus masters.

Preferably, the apparatus further includes a storage unit receives and stores the threshold page hit ratio corresponding to the plurality of bus masters.

The page hit ratio computing circuit preferably includes a plurality of first registers, each of which stores the number of memory accesses by a corresponding bus master and a plurality of second registers, each of which stores the number of page hits by a corresponding bus master. A plurality of computing units are included, each of which receives the number of memory accesses from the first registers and the number of page hits from the second registers, and computes the page hit ratios corresponding to each of the bus masters. An average unit averages the page hit ratios, and outputs an average page hit ratio that is used in the comparison.

If the average page hit ratio is greater than the threshold page hit ratio, the comparing unit outputs a page mode control signal to cause the memory to operate in an open page mode. If the average page hit ratio is less than the threshold page hit ratio, the comparing unit outputs a page mode control signal to cause the memory to operate in an closed page mode.

According to a third aspect of the invention, there is provided a method for controlling memory access to a memory by at least one bus master. A first parameter based on a number of memory accesses by the at least one bus master and a second parameter based on a number of page hits by the at least one bus master are received. At least one page hit ratio for the at least one bus master is computed based on the first and second parameters, and the at least one page hit ratio is output. The at least one threshold page hit ratio is compared with the at least one computed page hit ratio, and at least one page mode control signal is output in response to the comparison result. The at least one page mode control signal controls a page mode of the memory by the at least one bus master.

According to a fourth aspect of the invention, there is provided a method for controlling a memory access to a memory by a plurality of bus masters. For each of the plurality of bus masters, a first parameter based on a number of memory accesses by the corresponding bus master and a second parameter based on a number of page hits by the corresponding bus master are received. A page hit ratio for the plurality of bus masters is computed and output. A threshold page hit ratio for the memory is compared with the computed page hit ratio, and a page mode control signal is output in response to the comparison result, The page mode control signal controls a page mode of the memory by the plurality of bus masters.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF PREFERRED EMBODIMENTS

Figure 1:
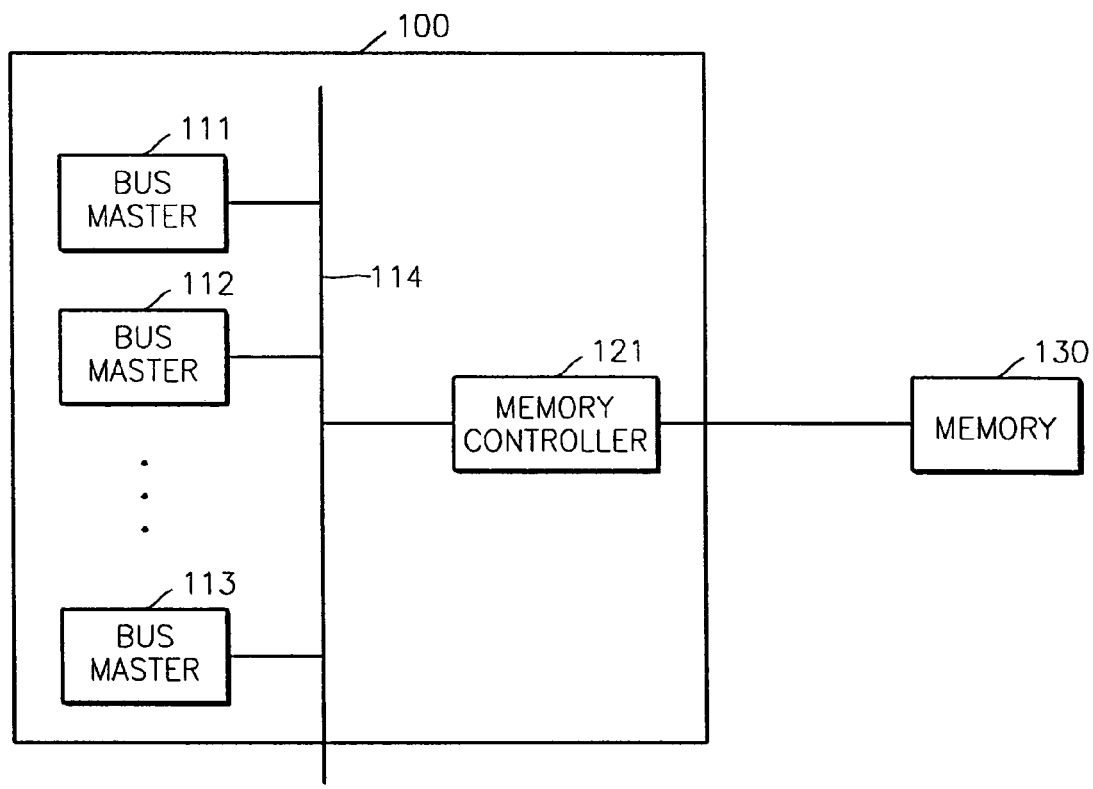
FIG. 1 is a schematic diagram of an interface between an external memory and a system-on-chip (SOC) system.
Figure 2:
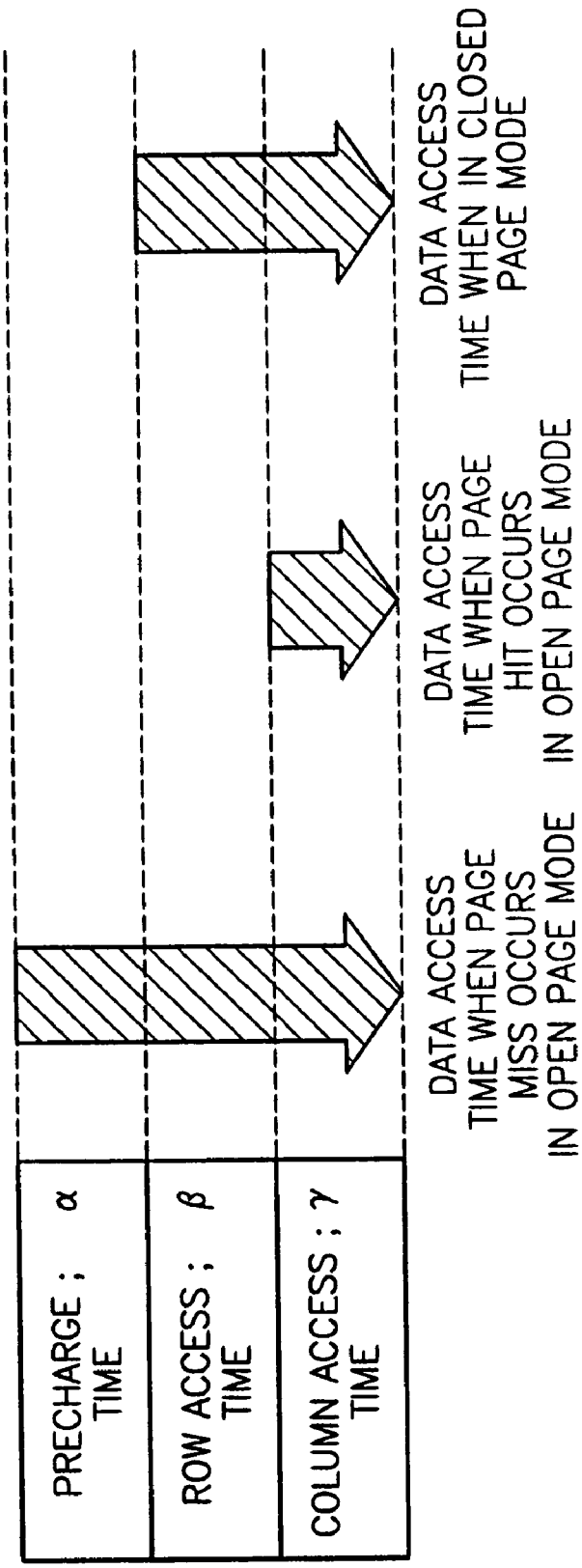
FIG. 2 illustrates the relationship between page modes and memory access time.

The present invention will now be described more fully with reference to the accompanying drawings, in which preferred embodiments of the invention are shown. The same reference numerals in different drawings represent the same element.

Figure 3:
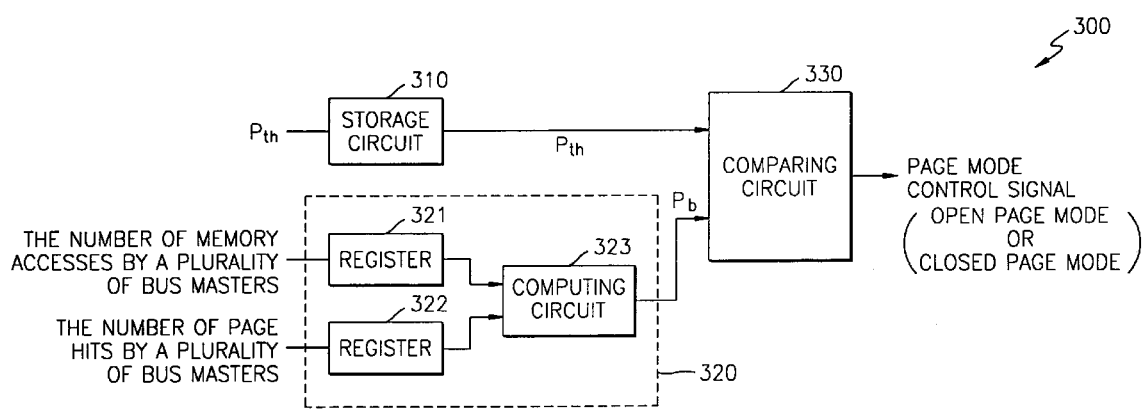
FIG. 3 is a block diagram of a memory control apparatus according to a preferred embodiment of the present invention.

FIG. 3 is a block diagram of a memory control apparatus 300 according to a preferred embodiment of the present invention.

The memory control apparatus 300 includes a storage circuit 310, a page hit ratio computing circuit 320, and a comparing circuit 330. The page hit ratio computing circuit 320 includes a first register 321, a second register 322, and a computing circuit 323.

The storage circuit 310 receives respective threshold page hit ratios Pth of a memory (not shown) by a plurality of bus masters (not shown), and stores the threshold page hit ratios Pth. Here, since the threshold page hit ratios Pth depend on the amount of precharge time and row access time, the threshold page hit ratios Pth can be programmed.

The page hit ratio computing circuit 320 receives the number of memory accesses by each of the bus masters and the number of page hits by each of the bus masters, and computes page hit ratios Pb by each of the bus masters. In the page hit ratio computing circuit 320, the first register 321 counts the number of memory accesses by each of the bus masters, and stores the number of memory accesses. The second register 322 counts the number of page hits by each of the bus masters, and stores the number of page hits. The computing circuit 323 receives the number of memory accesses output from the first register 321 and the number of page hits output from the second register 322, and computes the page hit ratios Pb by each of the bus masters.

The comparing circuit 330 compares the programmed threshold page hit ratios Pth with the page hit ratios Pb by each of the bus masters obtained from the page hit ratio computing circuit 320 and outputs a predetermined page mode control signal.

The operation of the memory control apparatus 300 according to the present invention will be described with reference to FIG. 3. The storage circuit 310 receives the respective programmed threshold page hit ratios Pth and stores the programmed threshold page hit ratios Pth. The page hit ratio computing circuit 320 receives the number of memory accesses by each of the bus masters and the number of page hits by each of the bus masters and computes the corresponding page hit ratios Pb of each bus master. That is, the page hit ratio Pb is obtained, for example, by dividing each of the number of page hits into each of the number of memory accesses, for each bus master.

Next, the comparing circuit 330 compares the programmed threshold page hit ratios Pth by each of the bus masters with the computed page hit ratios Pb by each of the bus masters, and outputs page mode control signals in response to a comparison result obtained from the comparing circuit 330. Here, if the computed page hit ratio Pb by a certain bus master is larger than the corresponding threshold page hit ratio Pth, there is a high possibility that the page hit is generated in a memory (not shown). Thus, the comparing circuit 330 outputs a page mode control signal which causes the memory to operate in the open page mode. In contrast, if the computed page hit ratio Pb by a certain bus master is smaller than the corresponding threshold page hit ratios Pth, there is a high possibility that a page miss has occurred in the memory. Thus, the comparing circuit 330 outputs a page mode control signal, which causes the memory to operate in the closed page mode.

According to the present invention, because the memory control apparatus compares the threshold page hit ratio Pth with the computed page hit ratio Pb and selects a preferable page mode according to the comparison result, the memory access time of the memory by each of the bus masters can be reduced, as compared to the conventional memory control apparatus in which only one of the open and closed page modes by each of the bus masters is statically selected.

Figure 4:
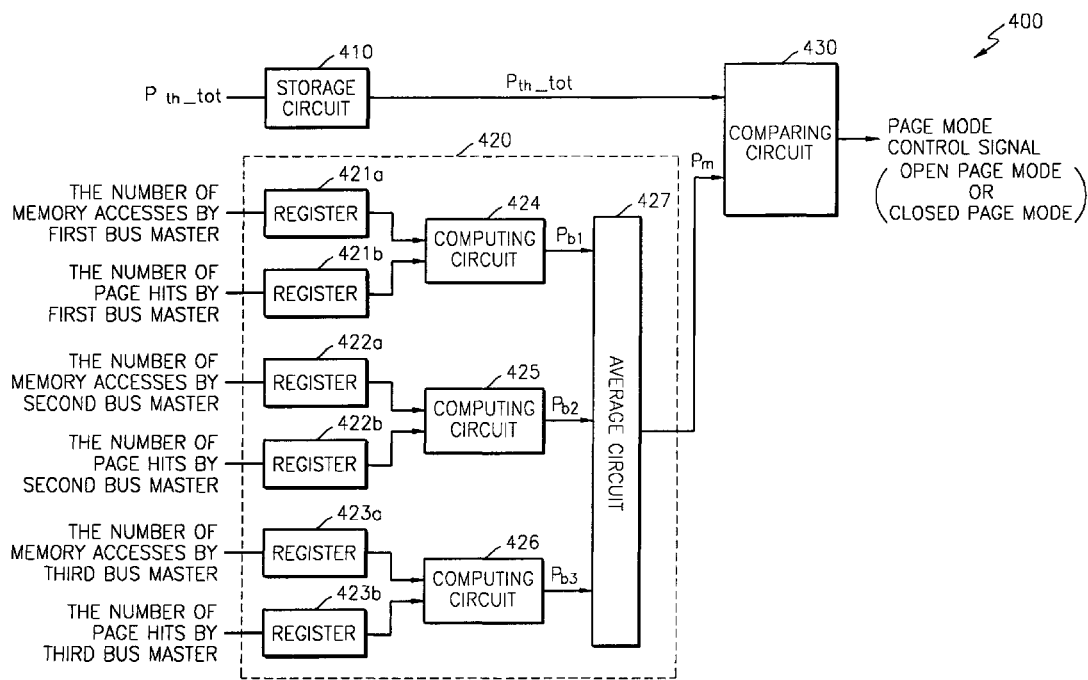
FIG. 4 is a block diagram of a memory control apparatus according to another preferred embodiment of the present invention.

FIG. 4 is a block diagram of a memory control apparatus 400 according to another preferred embodiment of the present invention. The memory control apparatus 400 includes a storage circuit 410, a page hit ratio computing circuit 420 and a comparing circuit 430.

The storage circuit 410 receives a threshold page hit ratio $Pth_{13}$ tot which is applied to the entire memory (not shown), and stores the threshold page hit ratio Pth_tot. The threshold page hit ratio Pth_tot can be programmed, as in the previous embodiment shown in FIG. 3.

The page hit ratio computing circuit 420 includes first, second, third, fourth, fifth, and sixth registers 421a, 421b, 422a, 422b, 423a, and 423b receiving each of the number of memory accesses by the first, second, and third bus masters (not shown) and each of the number of page hits by each of the first, second, and third bus masters; a plurality of computing circuits 424, 425, and 426 computing page hit ratios Pb1, Pb2 and Pb3 of each of the bus masters; and an average circuit 427 for averaging the page hit ratios Pb1, Pb2, and Pb3, and outputting an average value Pm of the page hit ratios Pb1, Pb2, and Pb3.

The first register 421a counts the number of memory accesses by the first bus master and stores the number of memory accesses. The second register 421b counts the number of page hits by the first bus master and stores the number of page hits. The computing circuit 424 receives the number of memory accesses output from the first register 421a and the number of page hits output from the second register 421b and computes the page hit ratio Pb1 of the first bus master.

The third register 422a counts the number of memory accesses by the second bus master and stores the number of memory accesses. The fourth register 422b counts the number of page hits by the second bus master and stores the number of page hits. The computing circuit 425 receives the number of memory accesses output from the third register 422a and the number of page hits output from the fourth register 422b and computes the page hit ratio Pb2 of the second bus master.

The fifth register 423a counts the number of memory accesses by the third bus master, and stores the number of memory accesses. The sixth register 423b counts the number of page hits by the third bus master and stores the number of page hits. The computing circuit 426 receives the number of memory accesses output from the fifth register 423a and the number of page hits output from the sixth register 423b and computes the page hit ratio Pb3 of the third bus master. Although three circuits, for example complementary registers and computing circuits, are shown in FIG. 4 for computing the page hit ratios of three bus masters, additional register and computing circuits may be added for computing additional page hit ratios of additional bus masters.

The average circuit 427 receives the page hit ratios Pb1, Pb2 and Pb3, averages the received page hit ratios Pb1, Pb2 and Pb3, and outputs the average value Pm. The comparison circuit 430 compares the threshold page hit ratio Pth_tot with the average value Pm, and outputs a predetermined page mode control signal in response to a comparison result obtained from the comparing circuit 430. The page mode of the memory is selected according to the predetermined page mode control signal.

Comparing the memory control apparatus 300 of FIG. 3 with the memory control apparatus 400 of FIG. 4, the memory control apparatus 300 of FIG. 3 can select preferable page modes for each of the bus masters, while the memory control apparatus 400 selects a single preferable page mode for all of the bus masters. That is, in the memory control apparatus 300 of FIG. 3, an open page mode can be selected by one bus master, and a closed page mode can be selected by another bus master. However, in the memory control apparatus 400 of FIG. 4, only one page mode can be selected by all of the bus masters. Thus, unlike the memory control apparatus 300, the memory control apparatus 400 further includes the average circuit 427 for obtaining the average value Pm of the computed page hit ratios Pb1, Pb2 and Pb3 by each of the bus masters, in order to select a page mode that is suitable for the overall memory device.

According to the present invention, since the page mode of the memory can be dynamically selected by computing the page hit ratios by each of the bus masters and using the computation result, memory access time can therefore be reduced.

Figure 5:
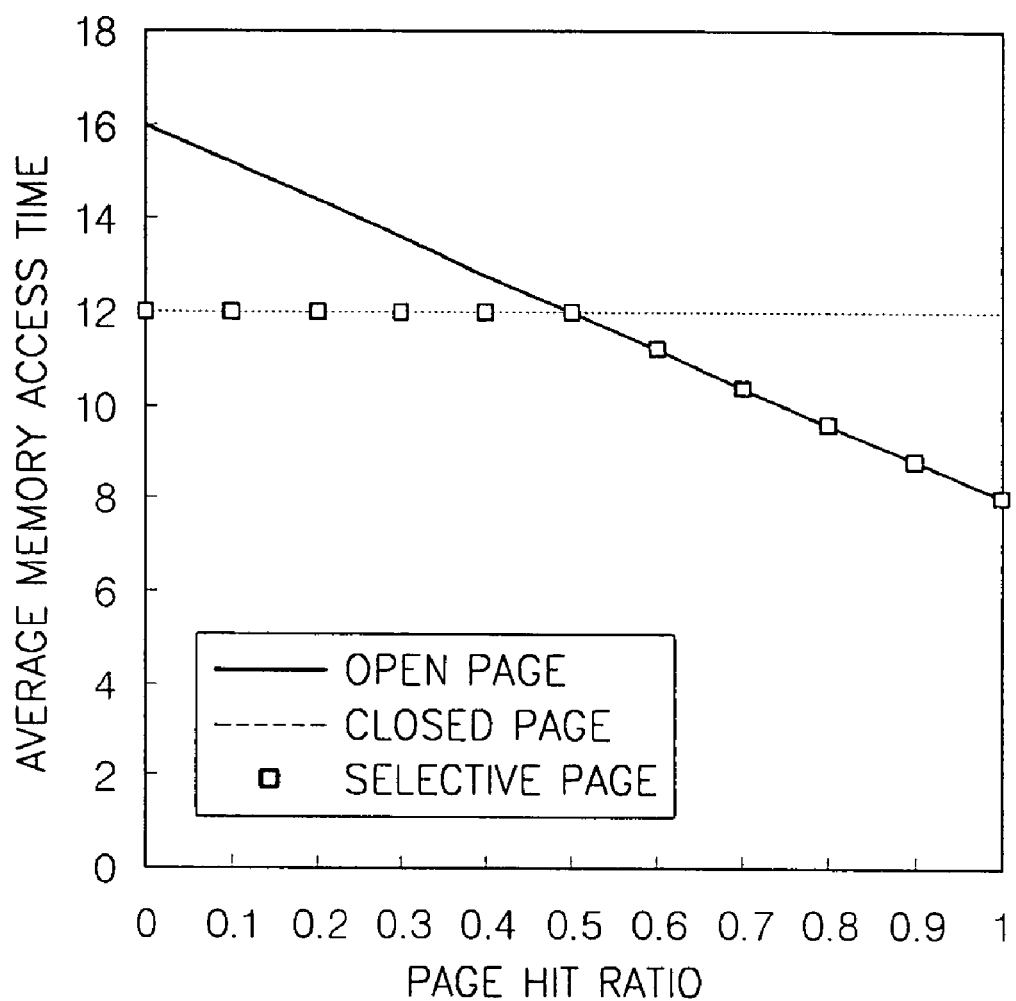
FIG. 5 is a graph comparing memory access times for the conventional approach and the present invention.

FIG. 5 is a graph that comparatively illustrates memory access of the conventional approach and the present invention.

As can be seen from FIG. 5, the open page mode is preferred if the page hit ratio is larger than 0.5, and the closed page mode is preferable if the page hit ratio is smaller than 0.5, in terms of the reduction of the memory access time. Since the memory control apparatus according to the present invention selects the page mode of the memory according to the page hit ratio, the memory control apparatus according to the present invention is highly advantageous in terms of the reduction of the memory access time.

As described above, since the apparatus and method for controlling the memory according to the present invention computes the page hit ratios of each of the bus masters, compares the predetermined threshold page hit ratio with the computed page hit ratio, and selects the preferable page mode according to the comparison result, the memory access time can be remarkably reduced, as compared to the conventional memory control apparatus.

While the present invention has been particularly shown and described with reference to preferred embodiments thereof, it will be understood by those of ordinary skill in the art that various changes in form and details may be made herein without departing from the spirit and scope of the present invention as defined by the appended claims.

What is claimed is:

1. A memory control apparatus for controlling memory access to a memory by at least one bus master, comprising:
    a page hit ratio computing unit which receives a first parameter based on a number of memory accesses by the at least one bus master and a second parameter based on a number of page hits by the at least one bus master, computes at least one page hit ratio for the at least one bus master based on the first and second parameters, and outputs the at least one page hit ratio; and
    a comparing unit which compares at least one threshold page hit ratio with the at least one computed page hit ratio, and outputs at least one page mode control signal in response to the comparison result,
    wherein the at least one page mode control signal controls a page mode of the memory by the at least one bus master.

2. The memory control apparatus of claim 1, further comprising a storage unit which receives and stores the at least one threshold page hit ratio corresponding to at least one bus master.

3. The memory control apparatus of claim 1, wherein the page hit ratio computing unit includes:
    a first register which stores the number of memory accesses by the at least one bus master;
    a second register which stores the number of page hits by the at least one bus master; and
    a computing unit which receives the number of memory accesses from the first register and the number of page hits from the second register, and computes the at least one computed page hit ratio of the at least one bus master.

4. The memory control apparatus of claim 1, wherein if the at least one computed page hit ratio for a corresponding at least one bus master is greater than the corresponding at least one threshold page hit ratio, the comparing unit outputs at least one page mode control signal to cause the memory to operate in an open page mode for the bus master.

5. The memory control apparatus of claim 1, wherein if the at least one computed page hit ratio for a corresponding at least one bus master is less than the corresponding at least one threshold page hit ratio, the comparing unit outputs at least one page mode control signal to cause the memory to operate in a closed page mode for the bus master.

6. A memory control apparatus for controlling a memory access to a memory by a plurality of bus masters, comprising:
    a page hit ratio computing unit which receives, for each of the plurality of bus masters, a first parameter based on a number of memory accesses by the corresponding bus master and a second parameter based on a number of page hits by the corresponding bus master, which computes a page hit ratio for the plurality of bus masters, and which outputs the computed page hit ratio; and
    a comparing unit which compares a threshold page hit ratio for the memory with the computed page hit ratio, and outputs a page mode control signal in response to the comparison result,
    wherein the page mode control signal controls a page mode of the memory by the plurality of bus masters.

7. The memory control apparatus of claim 6, further comprising a storage unit which receives and stores the threshold page hit ratio corresponding to the plurality of bus masters.

8. The memory control apparatus of claim 6, wherein the page hit ratio computing circuit includes:
    a plurality of first registers, each of which stores the number of memory accesses by a corresponding bus master;
    a plurality of second registers, each of which stores the number of page hits by a corresponding bus master;
    a plurality of computing units, each of which receives the number of memory accesses from the first registers and the number of page hits from the second registers, and computes the page hit ratios corresponding to each of the bus masters; and
    a average unit which averages the page hit ratios, and outputs an average page hit ratio that is used in the comparison.

9. The memory control apparatus of claim 6, wherein if the average page hit ratio is greater than the threshold page hit ratio, the comparing unit outputs a page mode control signal to cause the memory to operate in an open page mode.

10. The memory control apparatus of claim 6, wherein if the average page hit ratio is less than the threshold page hit ratio, the comparing unit outputs a page mode control signal to cause the memory to operate in an closed page mode.

11. A method for controlling memory access to a memory by at least one bus master, comprising:
    receiving a first parameter based on a number of memory accesses by the at least one bus master and receiving a second parameter based on a number of page hits by the at least one bus master, computing at least one page hit ratio for the at least one bus master based on the first and second parameters, and outputting the at least one page hit ratio; and
    comparing at least one threshold page hit ratio with the at least one computed page hit ratio, and outputting at least one page mode control signal in response to the comparison result,
    wherein the at least one page mode control signal controls a page mode of the memory by the at least one bus master.

12. The method of claim 11, further comprising a receiving and storing the at least one threshold page hit ratio corresponding to at least one bus master.

13. The method of claim 11, further comprising:
counting and storing the number of memory accesses by the at least one bus master;
counting and storing stores the number of page hits by the at least one bus master; and
computing the at least one computed page hit ratio of the at least one bus master, based on the number of memory accesses and the number of page hits.

14. The method of claim 11, wherein if the at least one computed page hit ratio for a corresponding at least one bus master is greater than the corresponding at least one threshold page hit ratio, further comprising outputting at least one page mode control signal to cause the memory to operate in an open page mode for the bus master.

15. The method of claim 11, wherein if the at least one computed page hit ratio for a corresponding at least one bus master is less than the corresponding at least one threshold page hit ratio, further comprising outputting at least one page mode control signal to cause the memory to operate in a closed page mode for the bus master.

16. A method for controlling a memory access to a memory by a plurality of bus masters, comprising:
receiving, for each of the plurality of bus masters, a first parameter based on a number of memory accesses by the corresponding bus master and a second parameter based on a number of page hits by the corresponding bus master, computing a page hit ratio for the plurality of bus masters, and outputting the computed page hit ratio; and
comparing a threshold page hit ratio for the memory with the computed page hit ratio, and outputting a page mode control signal in response to the comparison result,
wherein the page mode control signal controls a page mode of the memory by the plurality of bus masters.

17. The method of claim 16, further comprising receiving and storing the threshold page hit ratio corresponding to the plurality of bus masters.

18. The method of claim 16, further comprising:
counting and storing the number of memory accesses by each of the plurality of bus masters;
counting and storing the number of page hits by each of the plurality of bus masters;
computing the page hit ratios corresponding to each of the bus masters based on the number of memory accesses and the number of page hits; and
averaging the page hit ratios, and outputting an average page hit ratio that is used in the comparison.

19. The method of claim 16, wherein if the average page hit ratio is greater than the threshold page hit ratio, further comprising outputting a page mode control signal to cause the memory to operate in an open page mode.

20. The method of claim 16, wherein if the average page hit ratio is less than the threshold page hit ratio, further comprising outputting a page mode control signal to cause the memory to operate in a closed page mode.

* * * * *